(12) United States Patent
Oki et al.

(10) Patent No.: US 6,616,050 B1
(45) Date of Patent: Sep. 9, 2003

(54) IC CARD READER WITH ROTATING MEMBER

(75) Inventors: Hajime Oki, Osaka (JP); Yasuhiro Kanayama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/521,082

(22) Filed: Mar. 7, 2000

(30) Foreign Application Priority Data

Mar. 8, 1999 (JP) ............................................ 11-060068

(51) Int. Cl.[7] .............................................. G06K 13/04
(52) U.S. Cl. ...................... 235/479; 235/483; 235/485; 235/486; 235/475; 235/441; 235/492
(58) Field of Search ................................. 235/479, 481, 235/483, 485, 486, 475, 441, 492

(56) References Cited

U.S. PATENT DOCUMENTS

| | | | | |
|---|---|---|---|---|
| 3,705,396 A | * | 12/1972 | Nagaki et al. ... | 235/61.12 M X |
| 3,836,753 A | * | 9/1974 | Pass ............................. | 235/449 |
| 4,176,783 A | * | 12/1979 | Eppich ........................ | 235/474 |
| 4,820,186 A | * | 4/1989 | Fujii ........................... | 439/326 |
| 5,012,078 A | * | 4/1991 | Pernet ......................... | 235/441 |
| 5,170,595 A | * | 12/1992 | Wiand .......................... | 51/394 |
| 5,192,859 A | * | 3/1993 | Kojima et al. .............. | 235/481 |
| 5,334,827 A | * | 8/1994 | Bleier et al. ................ | 235/380 |
| 5,872,353 A | * | 2/1999 | Reichardt et al. .......... | 235/441 |
| 5,909,025 A | * | 6/1999 | Schmitt et al. ............. | 235/492 |
| 5,949,827 A | * | 9/1999 | DeLuca et al. ............. | 375/324 |
| 6,021,948 A | * | 2/2000 | Tsai et al. ................... | 235/486 |
| 6,149,064 A | * | 11/2000 | Yamaoka et al. ........... | 235/479 |
| 6,170,595 B1 | * | 1/2001 | Denz et al. ................. | 180/287 |

FOREIGN PATENT DOCUMENTS

| | | | |
|---|---|---|---|
| EP | 0 881 589 A1 | | 12/1998 |
| JP | 7-175897 | | 7/1995 |
| JP | 881589 A1 | * | 12/1998 |
| JP | 411039442 A | * | 2/1999 |
| WO | 89-04994 A1 | | 2/1998 |

* cited by examiner

Primary Examiner—Michael G. Lee
Assistant Examiner—Daniel Walsh
(74) Attorney, Agent, or Firm—Pearne & Gordon LLP

(57) ABSTRACT

An IC card reader comprising an contact and a rotating member. The contact is for coming into contact with an IC contact terminal of a card. The rotating member is rotated by the insertion of the card. The rotating member starts to rotate as the card presses a portion of the rotating member, and the portion of the rotating member presses the card on a rear surface thereof when the rotating member rotates.

13 Claims, 11 Drawing Sheets

IC CARD READER WITH ROTATING MEMBER

BACKGROUND OF THE INVENTION

1. Field of the Invention

The present invention relates to a card reader and electronic equipment which handles a card provided with a magnetic stripe or an IC chip and effects reading and writing of information.

2. Description of the Related Art

As shown in FIG. 11, a conventional card reader is comprised of a card inserting portion 100 into which a card 20 is inserted; a slider 101 which moves in interlocking relation to the card 20 upon insertion of the card 20; an ejection spring 102 for urging the slider 101 in an ejecting direction; a slider retaining portion 103a of a slider connecting portion 103 for stopping and locking the slider 101 at the position where the slider 101 is present in the inserted state; a solenoid 104 for canceling the latch; a plunger 105 incorporated in the solenoid 104; a pin 105a in the plunger 105 for latching the slider retaining portion 103a; a spring 106 for urging the plunger 105 in a direction in which the plunger 105 can be easily latched; and a card detection switch 107 for detecting that the card has entered up to a predetermined position.

When the card is inserted, and the slider 101 loaded with the ejection spring 102 is inserted up to a predetermined position, the slider retaining portion 103a of the slider connecting portion 103 is set in a state of being caught by the pin 105a of the plunger 105 incorporated in the solenoid 104 for canceling the latch of the slider 101. Hence, the slider 101 is set in a state of being stopped at a predetermined position by being latched. Thus the arrangement provided is such that the IC contact is brought into contact with an IC terminal on the IC card, thereby making it possible to transmit and receive information through the IC terminal.

To eject the inserted card, by allowing a DC current to flow across the solenoid 104 for a predetermined time, the plunger 105 of the solenoid 104 is retracted into the solenoid 104, so that the slider retaining portion 103a of the slider 101 is unlatched from the pin 105a attached to the plunger 105 in the solenoid 104. As a result, the card together with the slider 101 is returned to the card inserting portion 100 by the urging force of the ejection spring 102, so that the IC card can be pulled out manually in the use of the card reader.

In such a card reader, if a card which has been cut into a length shorter than a normal card by way of tampering in the use or a broken card or the like ascribable to the poor state of its storage by the user is inserted into the card inserting portion, the card cannot be removed from the interior of the card reader, making it impossible to use the apparatus.

However, with the above-described conventional IC card reader, when the IC card is inserted in a guide passage of a card reader body and is located in a predetermined position where the reading and writing of IC card information can be effected, the card guide passage is not so structured as to press the IC card from the side of the IC card opposite to its side where the IC terminal portion is provided. In addition, since an opening portion is formed on the side of the IC card opposite to its side where the IC terminal portion is provided, although there is no problem in the case of a normal flat card in the contact between the IC contact and the IC terminal portion of the card, if a warped, bent, or deformed card is inserted, the contact between the IC terminal portion and the IC contact is not sufficient, so that there are cases where the reading and writing of information in the IC card cannot be effected.

SUMMARY OF THE INVENTION

The invention has as its object to provide an IC card reader which overcomes the above-described problems.

To attain the above object, the IC card reader of the invention comprises: an IC contact for coming into contact with an IC terminal of a card; and a rotating member which is rotated by the insertion of the card, wherein the rotating member starts to rotate about a rotating shaft as the card presses a portion of the rotating member, and a portion of the rotating member which rotated presses a surface of the card opposite to its surface with which the IC contact is brought into contact.

It is also preferable that the IC card reader of the present invention comprises: an IC contact for coming into contact with an IC terminal of a card; and a rotating member which is rotated by the insertion of the card, wherein a rotating shaft of the rotating member is located on a side of the card opposite to its side where the IC contact is provided.

In addition, the IC card reader of the present invention further comprises: a resilient member, such as a leaf spring, which is provided in a portion of the rotating member which comes into contact with the card.

In addition, the IC card reader of the present invention comprises: a switch which is switched on mechanically and/or electrically by the insertion of a card; and a power supply turning-on member which operates by the switching on of the switch.

In addition, in the IC card reader of the present invention, as the card is inserted, a card guide having a width slightly narrower than the width of the card is expanded to operate one surface of the card guide, and the switch is switched on as a side surface of the card is brought into contact with the switch.

In addition, the IC card reader of the present invention further comprises: a switch provided on the rotating member and adapted to be switched on when the card has been inserted into an innermost portion of the card reader, and has reached and rotated the rotating member.

DETAILED DESCRIPTION OF THE PREFERRED EMBODIMENTS

First Embodiment

Figure 1A:
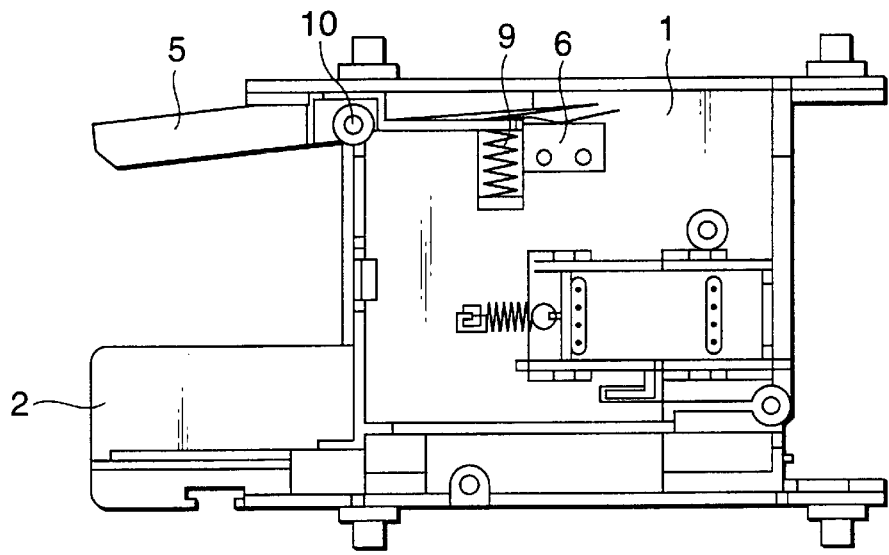
FIGS. 1A to 1C are schematic diagrams illustrating a card reader in accordance with a first embodiment of the present invention.

Referring now to the drawings, a description will be given of an embodiment of the invention.

Figure 1B:
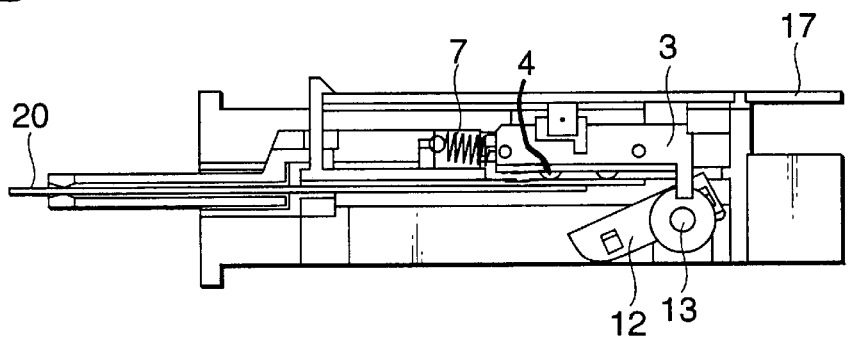
Figure 1C:
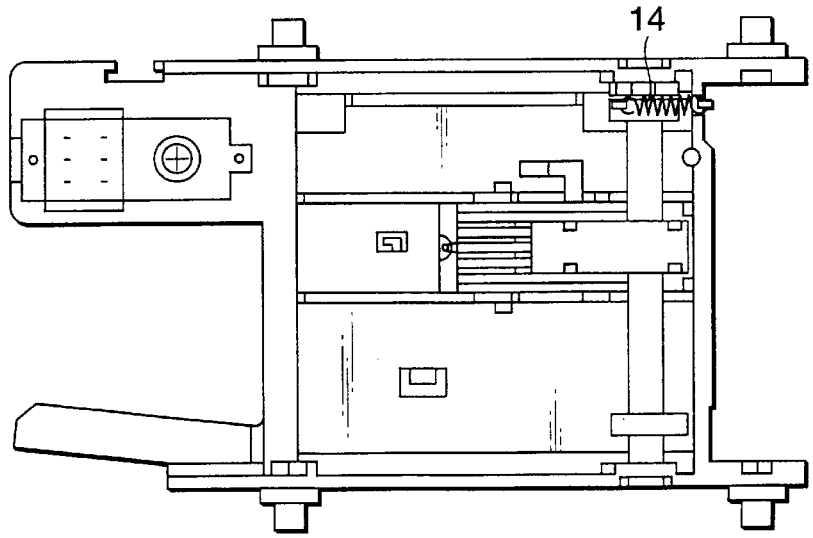
Figure 2A:
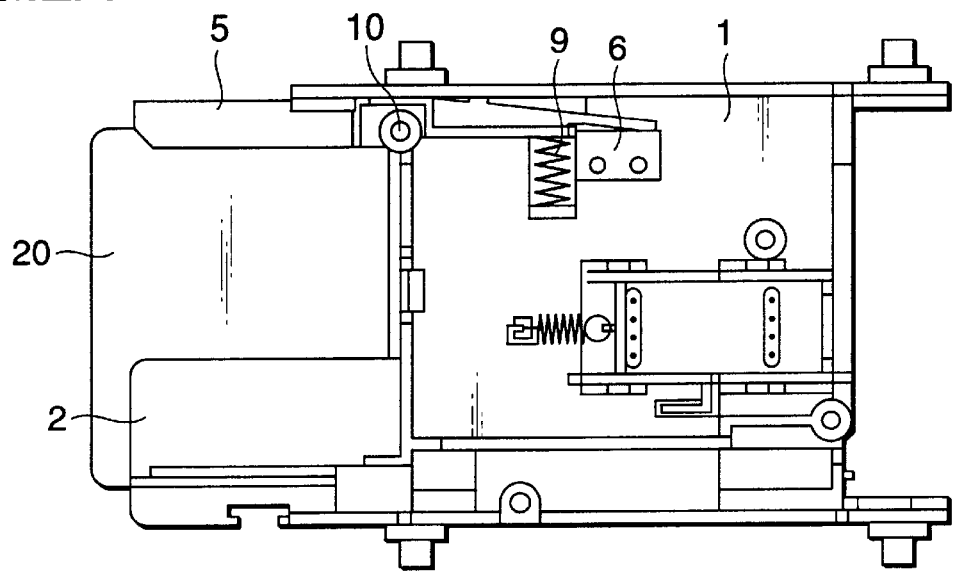
FIGS. 2A to 2C are diagrams of the card reader in accordance with the first embodiment of the invention, illustrate the arrangement of an IC contact mechanism and a rotating member, and illustrates a state in which the card has not yet reached the rotating member.
Figure 2B:
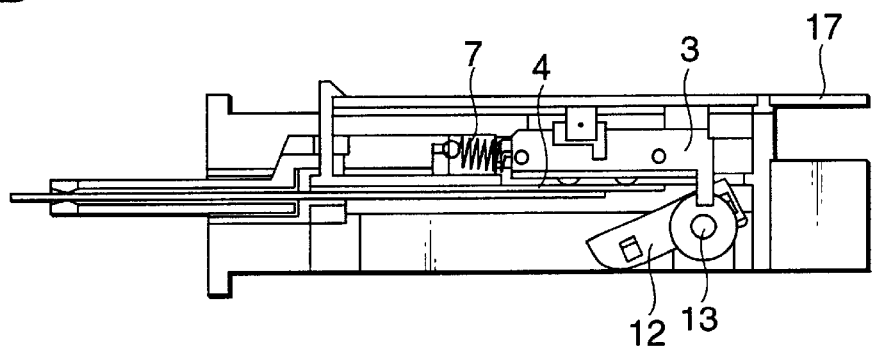
Figure 2C:
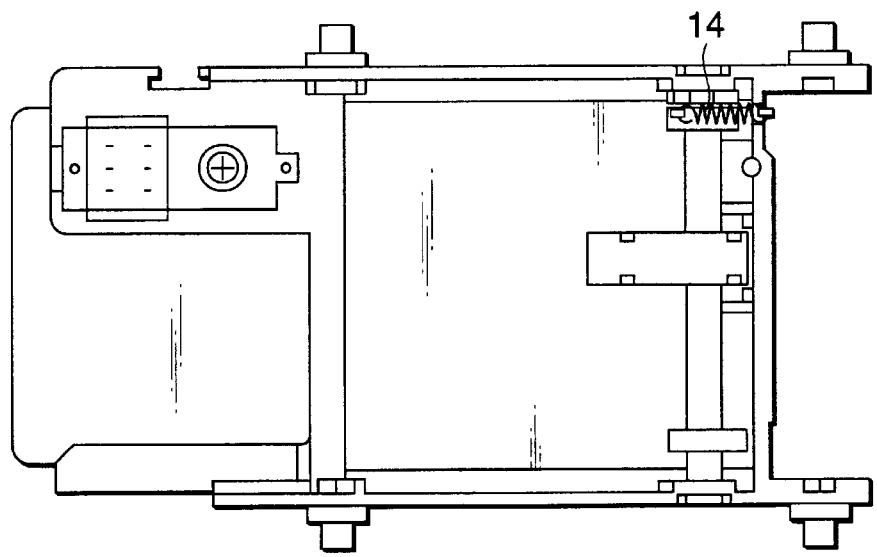
Figure 3A:
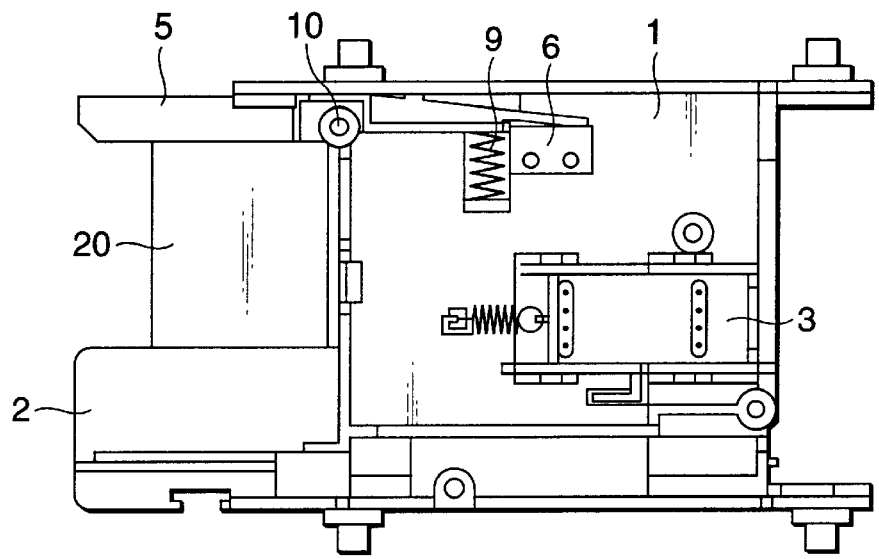
FIGS. 3A to 3C are diagrams of the card reader in accordance with the first embodiment of the present invention, illustrate the arrangement of the IC contact and the rotating member used in FIG. 2, and illustrates a state in which the card has reached the rotating member.
Figure 3B:
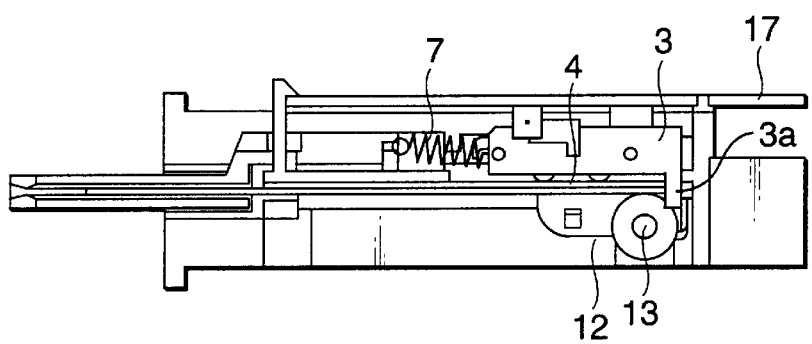
Figure 3C:
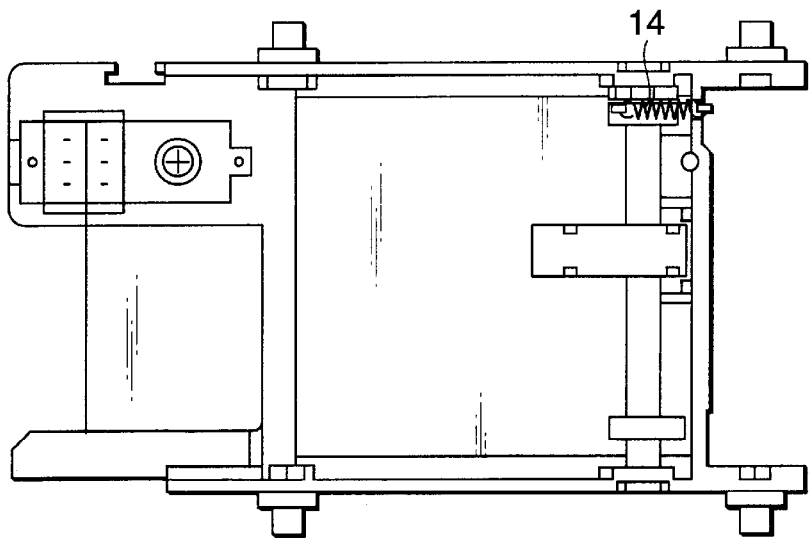
Figure 4A:
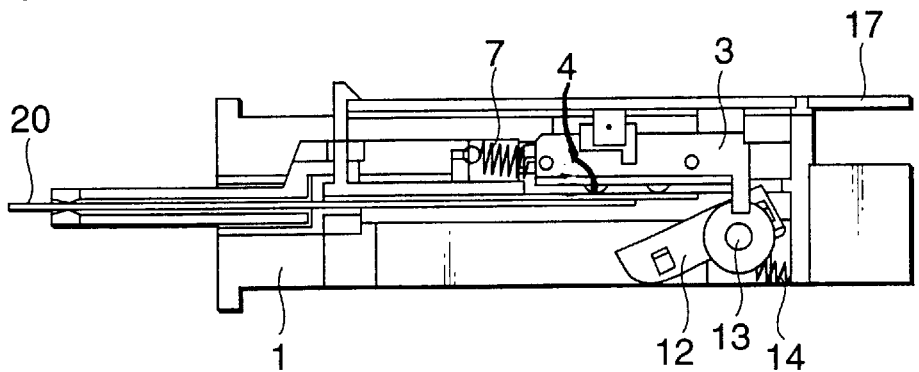
FIGS. 4A to 4C are diagrams of the card reader in accordance with the first embodiment of the invention, and illustrate the state of insertion of the card as well the positional relationship between the IC contact mechanism and the rotating member.
Figure 4B:
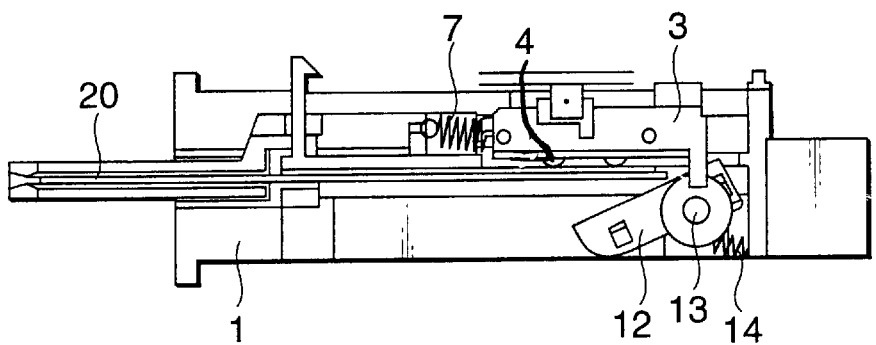
Figure 4C:
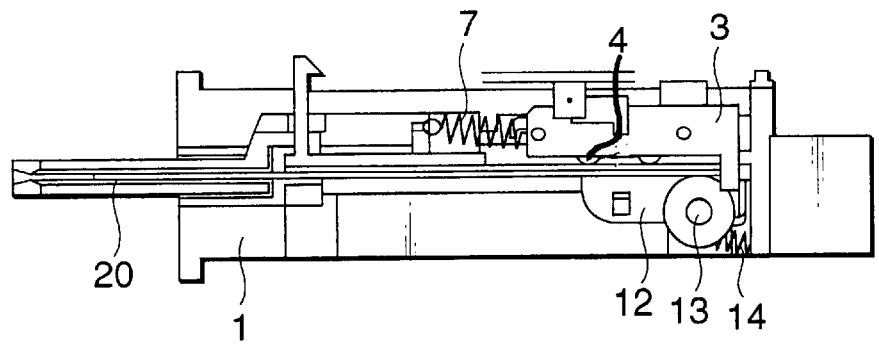
Figure 5A:
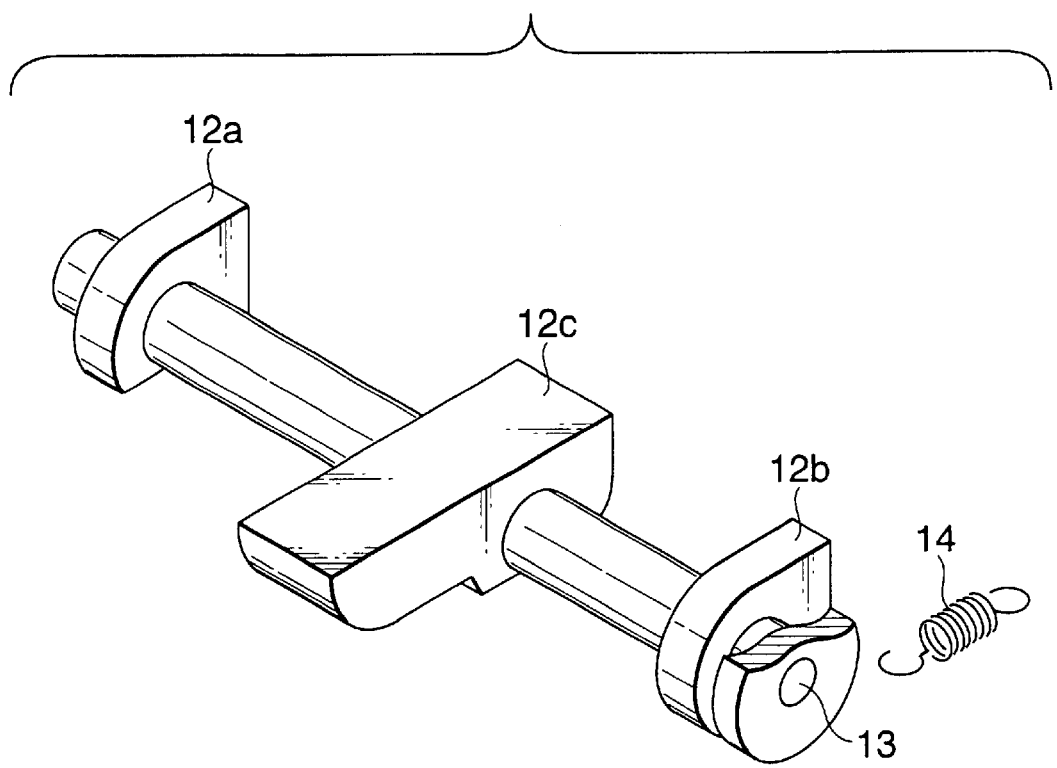
FIGS. 5A and 5B are diagrams illustrating the structure of portions of the rotating member which come into contact with the card in the card reader in accordance with the embodiments of the present invention.
Figure 5B:
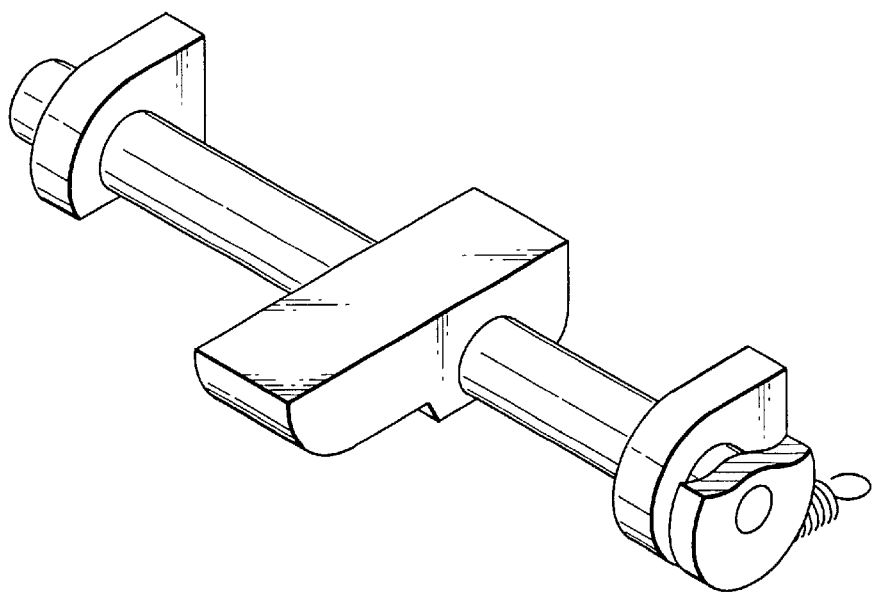

FIGS. 1A to 1C are schematic diagrams illustrating a card reader in accordance with a first embodiment of the invention. FIGS. 2A to 2C show structural diagrams of a card guide mechanism, an IC contact mechanism, and a rotating member which are used in the card reader in accordance with the first embodiment of the invention, and illustrate a state in which the card has not yet reached the rotating member. FIGS. 3A to 3C are diagrams illustrating a state in which the inserted card in FIG. 2 has reached the rotating member. FIGS. 4A to 4C are side elevational views illustrating a state in which the IC contact mechanism and the rotating member used in FIGS. 2A to 2C and 3A to 3C are operated by the insertion of the card. FIGS. 5A and 5B are diagrams in which the rotating member is configured by using a rotating member different from the one used in FIGS. 2A to 2C. FIGS. 6A to 9B are diagrams illustrating the details of the rotating member. FIG. 9B is a diagram illustrating that a switch has been turned on by a portion of the rotating member used in FIGS. 2A to 2C.

In FIGS. 1A to 1C, the card reader is similar to the conventional card reader in that it is comprised of a card reader body portion 1, a card inserting portion 2, an IC contact holder 3, an IC contact 4, a card guide 5, a card-guide detecting switch 6, and an ejection spring 7. In this embodiment, however, the card reader is provided with a spring 9 for a card guide for actuating the card guide 5 in the width wise direction of the card in correspondence with the width of the card at the time of insertion and detection of the card, a shaft 10 for a card guide, a rotating member 12 located on the side opposing the IC contact, and a shaft 13 for rotating the rotating member.

In the above-described arrangement, a space (card guide passage) into which the card is inserted is formed in the card reader body portion 1. A description will be given of the operation in the above-described arrangement. A card 20 is inserted into the card inserting portion 2 of the card reader while expanding the card guide 5. The card guide 5 expands in correspondence with the width of the card 20. The card guide 5 is pressed by the force of the opposing spring 9 for a card guide, which acts with the shaft 10 for a card guide as a center, so that the card guide 5 presses the side surfaces of the card 20 and is set in the state of being in close contact with the card 20. This movement of the card guide 5 is detected by the card-guide detecting switch 6 for the card guide 5. The card-guide detecting switch 6 does not operate if the width of the card 20 is narrower than the initial width of a pair of opposing portions of the card guide 5 of the card inserting portion 2 of the card reader. The card 20 is inserted into the card guide passage for guiding the card 20 to the interior of the card reader body portion 1. As the card 20 together with the IC contact holder 3 urged by the ejection spring 7 is inserted into the interior of the card guide passage in the card reader body portion 1 up to the position where the reading and writing of information with respect to the card 20 are effected, the card 20 is guided by card guiding surfaces of the rotating member 12 which is formed coaxially with the rotating shaft 13 attached to the card reader body portion 1. These card guiding surfaces are provided on surfaces of the rotating member 12 which oppose opposite ends of the card 20 and at positions in the close vicinities of the IC contact 4.

As shown in FIGS. 3A–3C, the arrangement provided is such that once the card 20 is inserted, the rotating member 12 urged by a spring 14 rotates in a direction away form the IC contact 4, and the card guiding surfaces of the rotating member 12 press the card from the side opposing the IC contact 4 so that the IC terminal on the card 20 will positively come into contact with the IC contact 4, as shown in FIG. 3B. A pair of card guides 12a and 12b of the rotating member 12 at opposite end portions of the card 20, together with the opposing surface of the card reader body portion 1, form a space allowing the card 20 to be guided, and is formed to serve as a card presser while maintaining a space having a thickness closed to the card thickness when the card 20 is inserted up to a predetermined position. If the card 20 is flat and normal, the card 20 is inserted smoothly. On the other hand, if a warped or bent card is inserted, the aforementioned card presser formed in the space formed by the rotating member 12 and the card reader body portion 1 is capable of correcting the warp or bend of the card into a flat shape. The space defined by each card guide formed on the surface of the rotating member 12 opposing the IC contact 4 within the holder 3 is formed to be as narrow and small as possible within a range in which the IC contact 4 is capable of positively pressing the IC terminal on the card 20. The structure adopted is such that since the width of the card guides is made narrow, even if an irregular card or paper or the like other than the card is entered, it can be easily dropped and ejected from the card reader body portion 1.

Second Embodiment

Referring now to FIGS. 1, 2, and 4, a description will be given of a second embodiment of the invention.

This embodiment is similar to the first embodiment in that, in FIG. 1, the card reader is comprised of the card reader body portion 1, the card inserting portion 2, the IC contact holder 3, the IC contact 4, the card guide 5, the card-guide detecting switch 6, the ejection spring 7, the rotating member 12, the rotating shaft 13, and the spring 14.

A description will be given of the operation in the above-described arrangement. The card 20 is inserted through the card inserting portion 2 into the card guide passage for guiding the card 10 to the interior of the card reader body portion 1. The card 20, together with the IC contact holder 3 urged by the ejection spring 7, passes through the card guide passage. As shown in FIGS. 4A to 4C, projecting portions provided on the IC contact holder 3 form a groove provided in the card reader body portion 1, and press down the card 20 along an inclined portion (not shown). As shown in FIG. 4C, when the card 20 is fed to a predetermined position, the IC contact in the IC contact holder 3 is located at the position where it is capable of contacting the IC terminal (not shown) on the card 20. At the same time, as the card 20 is fed in, a guide 12c of the rotating member 12 presses the card 20 from the side of the card 20 opposite to its IC contact 4 side in such a manner as to rotate about the rotating shaft 13 of the rotating member 12 disposed at a position on the side of the card 20 away from the IC contact 4. Thus the positional relationship is such that the IC contact 4 can be positively brought into contact with the IC terminal (not shown) on the card 20.

Third Embodiment

Figure 6A:
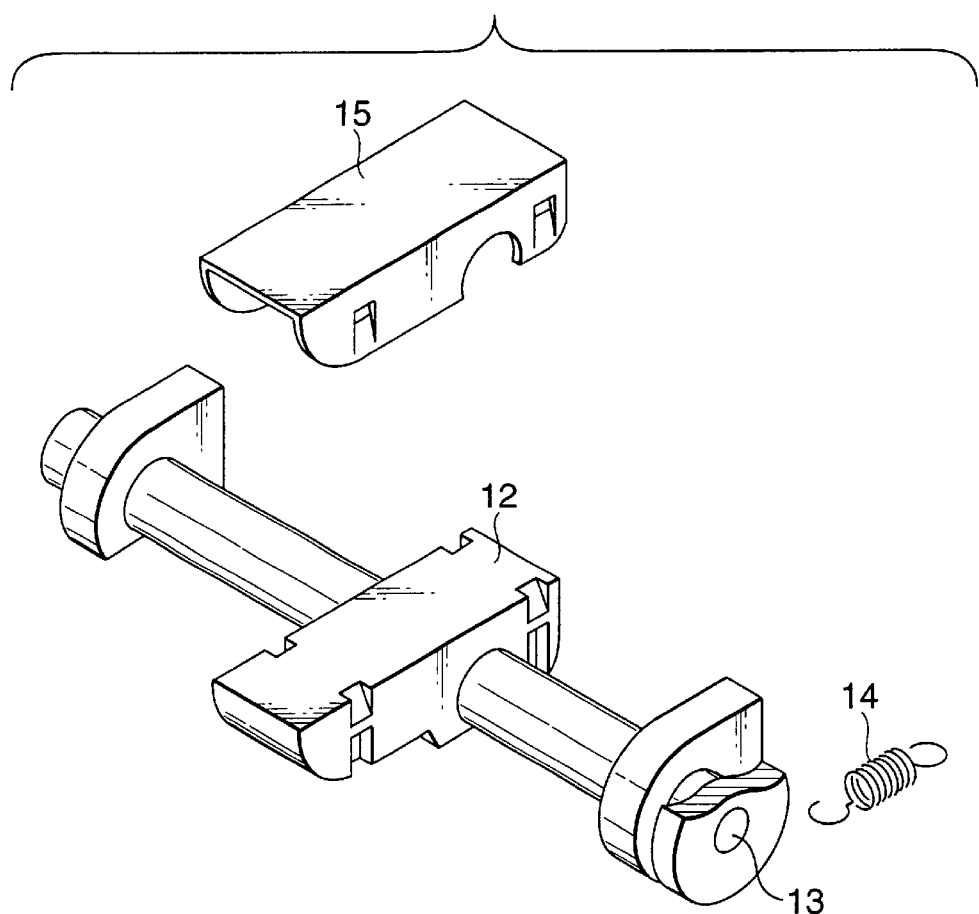
FIGS. 6A and 6B are diagrams illustrating the structure of the portions of the rotating member which come into contact with the card in the card reader in accordance with the third embodiment of the invention.
Figure 6B:
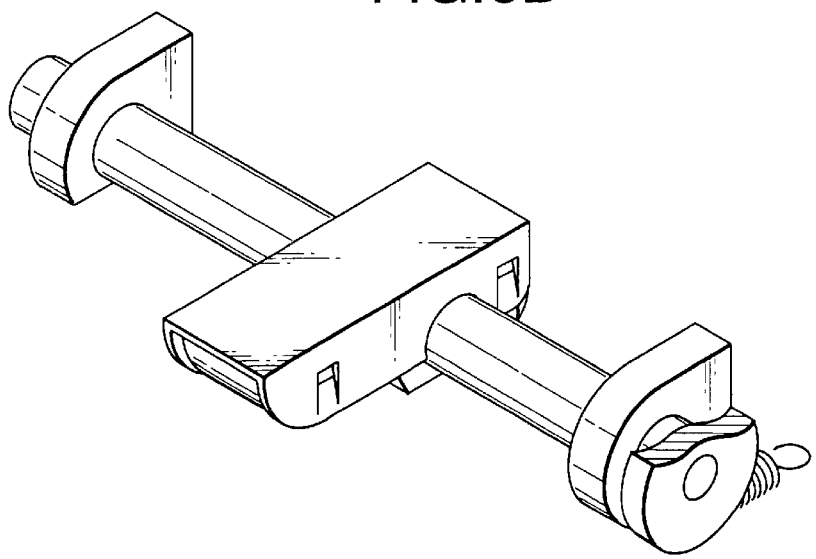

A third embodiment of the invention has an arrangement similar to that of the first embodiment. If the card 20 is inserted into the card guide passage for guiding the card 20 to the interior of the card reader body portion 1, the card 20, together with the IC contact holder 3, is fed to the predetermined position in the guide passage of the card reader. At this time, a holder projecting portion 3a provided in the IC contact holder 3 sets in an operating state a card detection switch (not shown) which detects that the card 20 has entered up to the predetermined position, so that the card 20 is stopped at a predetermined position in the card reader. In addition, as the card 20 is inserted, in the initial state one ends (the card inserting portion 2 side) of the guides 12a and 12b and a contact-opposing lever 12c of the rotating member 12 are lowered in the downward direction of the card reader body portion 1, while the other ends (the rear side of the card reader) of the guides 12a and 12b and the contact-opposing lever 12c are raised in the upward direction of the card reader body portion 1. The more the card 20 approaches the predetermined position after the insertion of the card 20, the more the guides 12a and 12b and the contact-opposing lever 12c of the rotating member 12 come to be located parallel with the card 20. Thus the card 20 assumes a state of being held by the IC contact 4 and the contact-opposing lever 12c and the guides 12a and 12b of the rotating member 12 which operate in the direction of pressing the card 20, allowing the reading and writing with respect to the card 20 to be executed. In this state, the higher the close contact between the card 20 and the guides 12a and 12b and the contact-opposing lever 12c of the rotating member 12, the more the reading and writing with respect to the card 20 is stabilized. FIGS. 5A and 5B show diagrams in which the rotating member 12 is formed by resin molding. FIG. 5a shows a diagram in which the rotating member 12 and the rotating shaft 13 are formed of an integrally resin-molded product having excellent wear resistance and slidability, while FIG. 5b shows a diagram in which the rotating member 12 and the rotating shaft 13 are separately formed and are combined as a unit. The rotating shaft may be formed of either a resin or a metal which does not cause trouble in the rotating action and has excellent wear resistance and slidability. FIG. 6A and 6B show diagrams in which a card presser plate 15 formed of a rigid plate or a resilient plate is used as the contact-opposing lever 12c of the rotating member 12 so as to improve the wear resistance and slidability. FIG. 6A is a diagram illustrating a state in which the rotating member 12 and the card presser plate 15 are separate, while FIG. 6B shows a diagram in which the card presser plate 15 is fitted to the rotating member 12. To prevent the card presser plate 15 from coming off the rotating member 12, projections which serve as pawls are provided in advance on the card presser plate 15, and recesses for catching the pawls are provided in advance in the portion of the rotating member 12 where the card presser plate 15 is fitted. During the fitting, the card pressing plate 15 is fixed by causing the pawls to be engaged in the recesses.

Figure 7A:
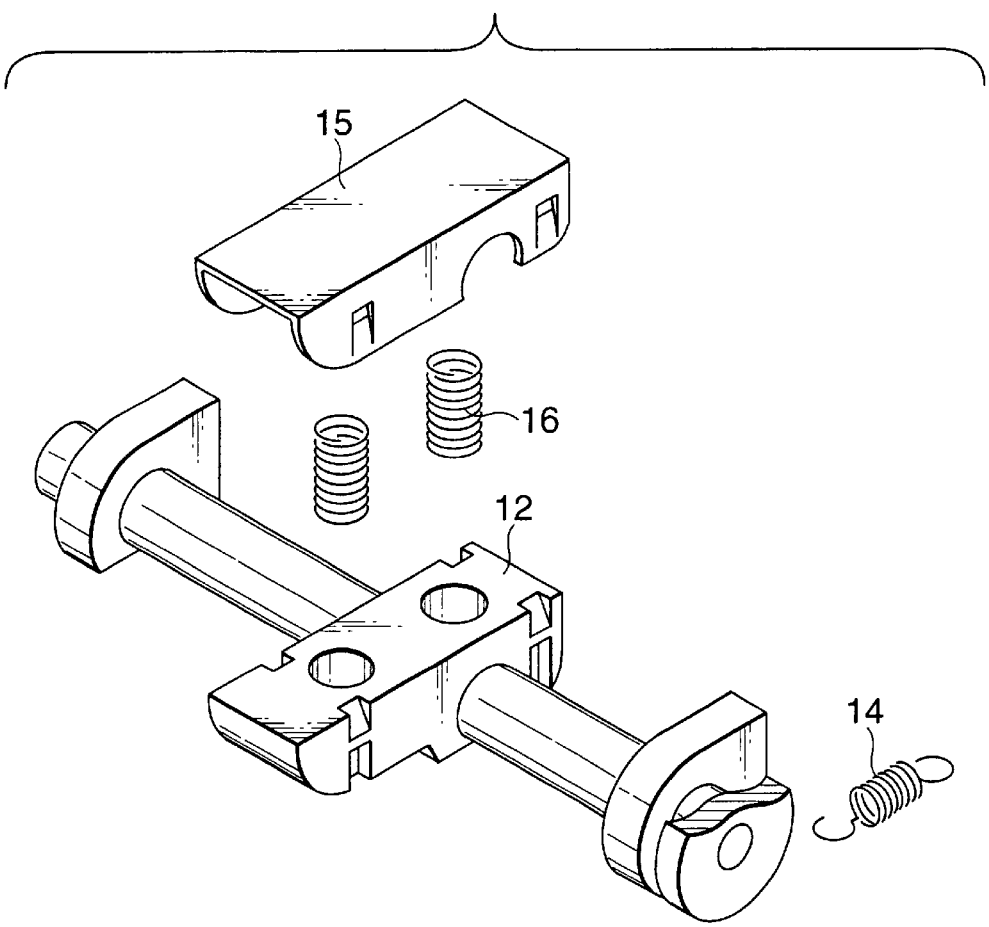
FIGS. 7A and 7B are diagrams illustrating the structure of the portions of the rotating member which come into contact with the card in the card reader in accordance with the third embodiment of the invention.
Figure 7B:
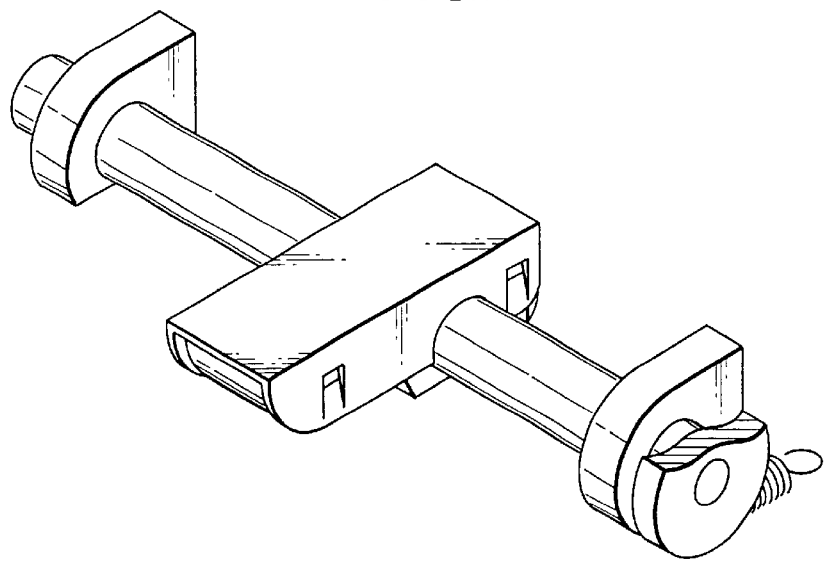

In FIGS. 7A and 7B, the card presser plate 15 having a form similar to that shown in FIG. 6 is used. In addition, when the card 20 is inserted through the card inserting portion, is passed along the card guide passage, and is brought to the predetermined position, the card 20 is held by the IC contact 4 and the rotating member 12. At this time, if a gap is produced between the card 20 and the contact-opposing lever 12c of the rotating member 12, the pressing force of the contact-opposing lever 12c with respect to the card 20 becomes weak, with the result that the pressing force with which the IC contact 4 is brought into contact with the IC terminal on the card 20 becomes weak. FIGS. 7A and 7B show diagrams in which, to prevent this pressing force from becoming weak, two presser plate springs 16 for pushing the card presser plate 15 upwardly toward the IC contact 4 are provided. The pressing force of the presser plate springs 16 (coil springs in the drawing) is set to be greater than the spring pressure of the IC contact 4 to cause the card presser plate 15 to positively come into contact with the card 20, thereby eliminating play for the card. FIG. 7A shows a diagram in which the rotating member 12, the card presser plat 15, and the presser plate springs 16 are separate, while FIG. 7B shows a diagram in which the card presser plat 15 and the presser plate springs 16 are assembled onto the rotating member 12.

Figure 8A:
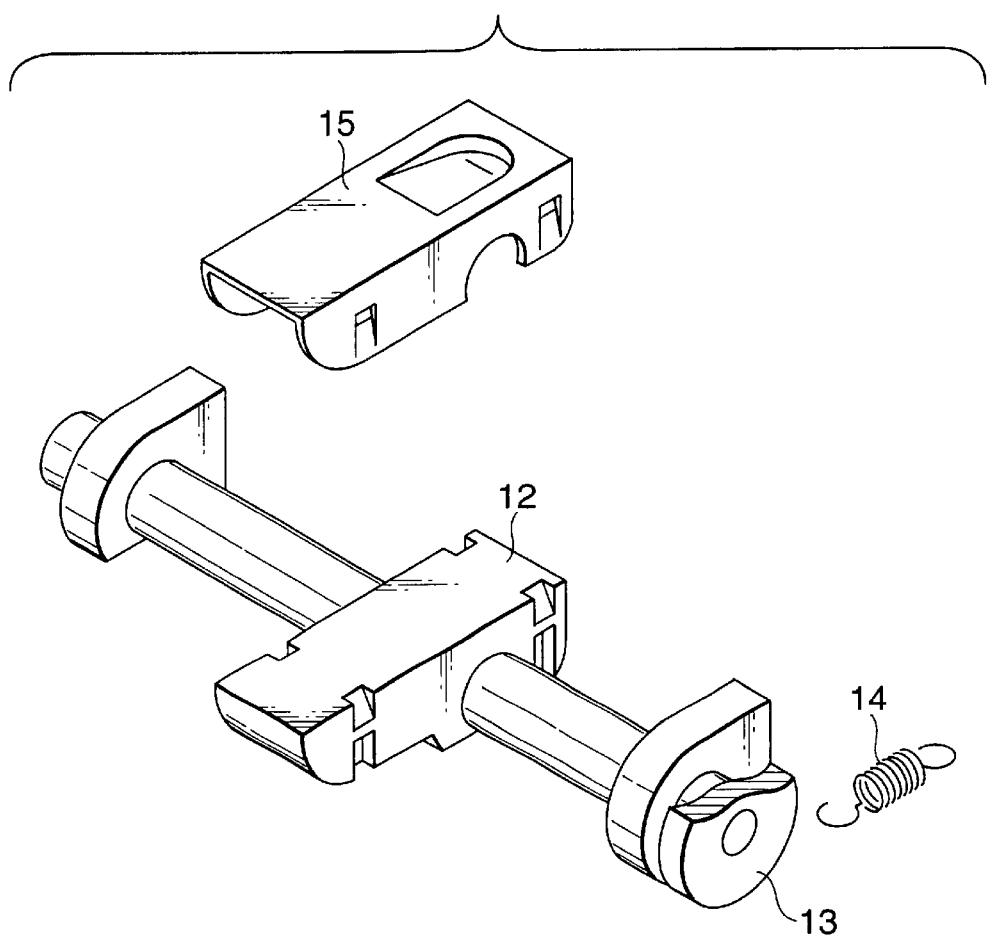
FIGS. 8A and 8B are diagrams illustrating the structure of the portions of the rotating member which come into contact with the card in the card reader in accordance with the third embodiment of the present invention.
Figure 8B:
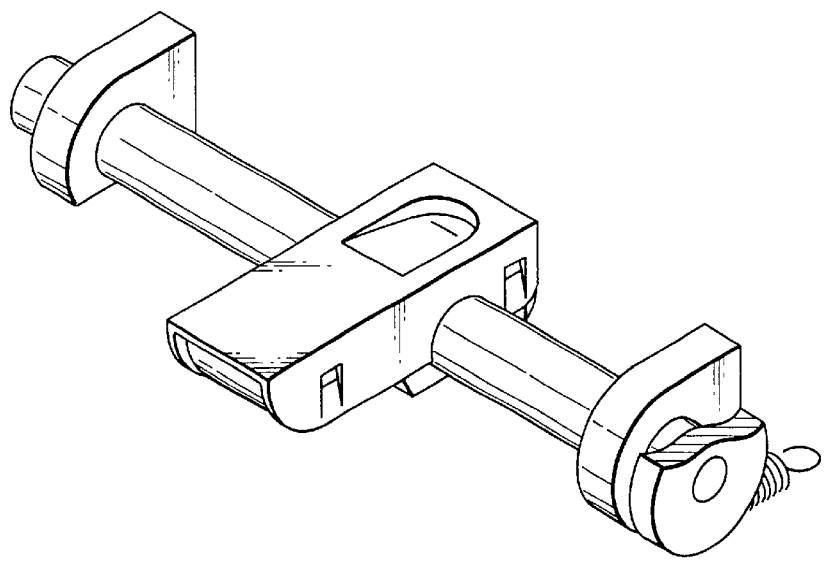

FIGS. 8A and 8B are similar to the example shown in FIGS. 7A and 7B. The card presser plate 15 has resiliency for positively establishing close contact for the card 20 in the same way as in FIG. 7. A resilient member is used for the card presser plate 15, and a leaf spring is formed in the card presser plate 15 so as to apply a pressing force toward the IC contact 4, and the pressing force of the leaf spring is set to be greater than the spring pressure of the IC contact 4.

Although diagrams shown in FIGS. 5A to 8B are diagrams in which the rotating shaft 13 is provided, and the rotating member 12, the rotating shaft 13, and the card presser plate 15 are combined, if a highly rigid material is used, the card presser plate 15 may be formed integrally with the rotating member 12 without providing the rotating shaft 13.

Fourth Embodiment

Referring now to FIGS. 1A to 2C and FIGS. 9A to 9B, a description will be given of a fourth embodiment of the invention.

This embodiment is similar to the first embodiment in that, in FIGS. 1A to 2C, the card reader is comprised of the card reader body portion 1, the card inserting portion 2, the IC contact holder 3, the IC contact 4, the card guide 5, the card-guide detecting switch 6, the ejection spring 7, the spring 9 for a card guide, the shaft 10 for a card guide, and the rotating member 12.

A description will be given of the operation in the above-described arrangement. If the card 20 is inserted into the card inserting portion 2 of the card reader, the card 20 is guided while expanding the card guide 5. The card guide 5 expands in correspondence with the width of the card 20. The card guide 5 is pressed by the force of the opposing spring 9 for a card guide, which acts with the shaft 10 for a card guide as a center, so that the card guide 5 presses the side surfaces of the card 20 and is set in the state of being in close contact with the card 20. The insertion of the card 20 is detected by a switch 8 for the card guide 5 through the movement of the card guide 5. If the card 20 having the normal width is inserted through the card inserting portion 2, the switch 8 is turned on, so that the switch 8 of a circuit of a p-plate 17 shown in FIG. 9 is set in a conducting state and effects the switching operation. By wiring the switch 8 for detection of the insertion of the card 20 to a power supply system of the electric circuit shown in FIG. 10, when the card 20 is inserted and the operating state is assumed, the power supply of the electric circuit is turned on, whereby the card-guide detecting switch 6 is switched on. Before the card 20 is inserted, the power supply of the electric circuit is in the off state, so that power saving can be attained.

Fifth Embodiment

Figure 10:
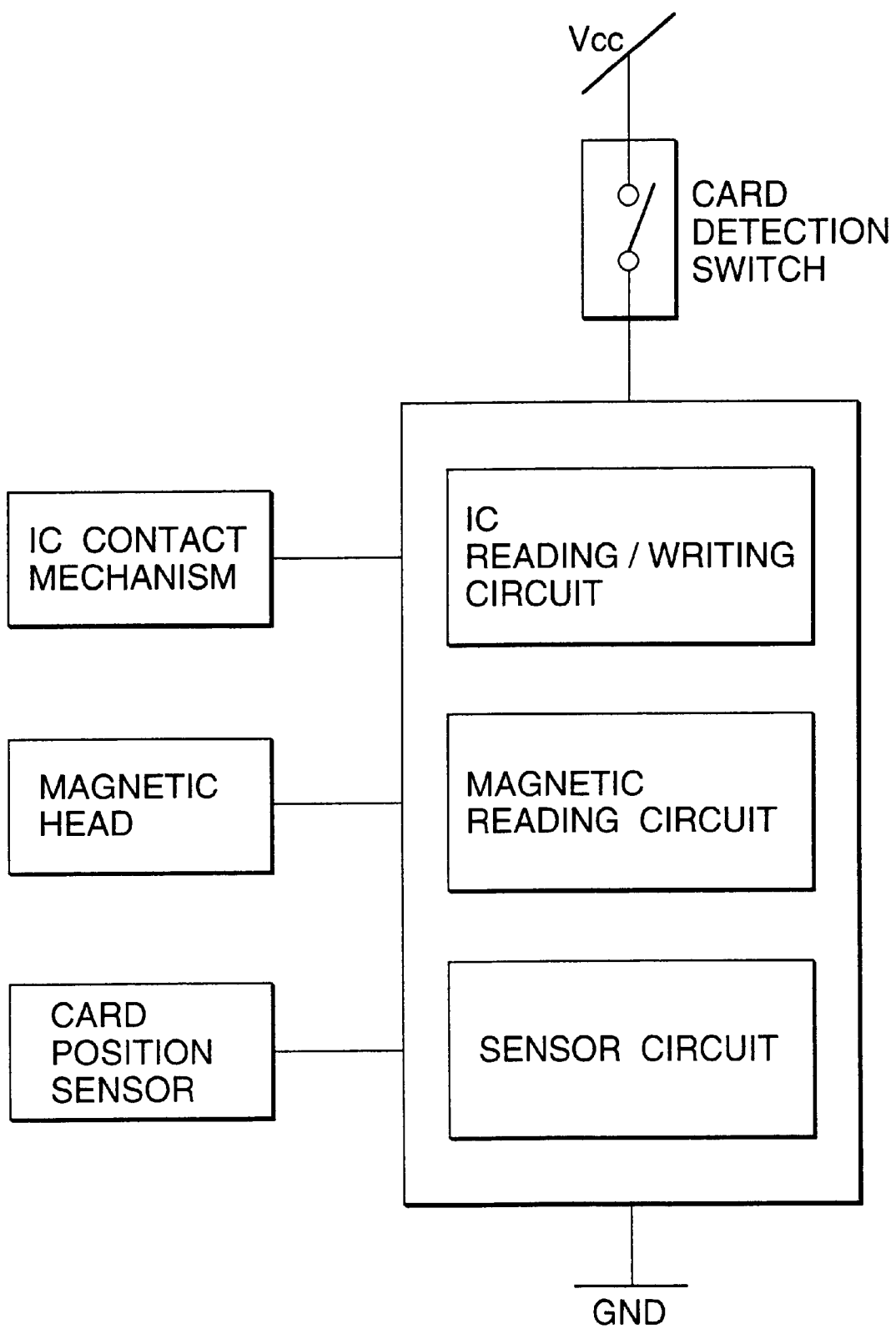
FIG. 10 is a diagram illustrating the switching operation of the switch with respect to the rotating member in the card reader in accordance with the first, fourth, fifth, and sixth embodiments of the invention.

In a fifth embodiment of the invention, in the same way as in the fourth embodiment, when the card 20 is inserted through the inserting portion 2 of the card reader, the side surfaces of the card 20 come into contact with and expand the card guide 5, and if the switch for detecting the card width is operated, the card-insertion detecting switch of the electric circuit shown in FIG. 10 is switched on.

Sixth Embodiment

Referring now to FIGS. 1A to 2C and 9A to 10, a description will be given of a sixth embodiment of the invention.

Figure 9A:
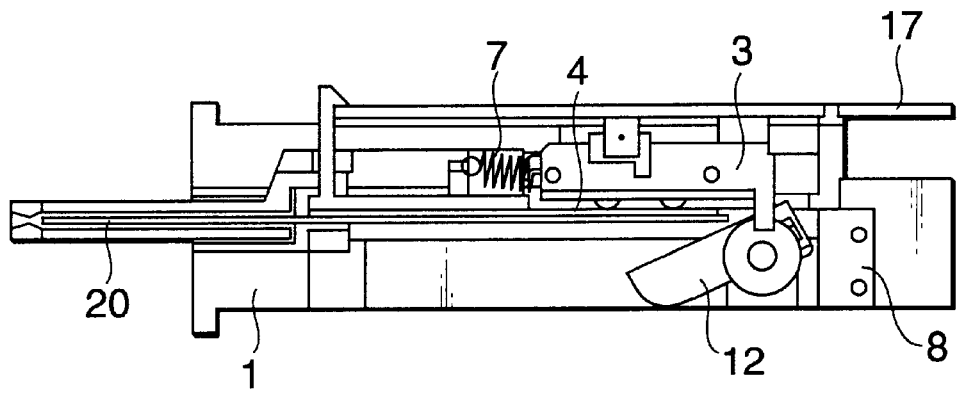
FIGS. 9A and 9B are diagrams illustrating the card reader in accordance with the first, fourth, and fifth embodiments of the present invention, and illustrate the state in which the power supply is turned only the switching operation of a card detection switch.
Figure 9B:
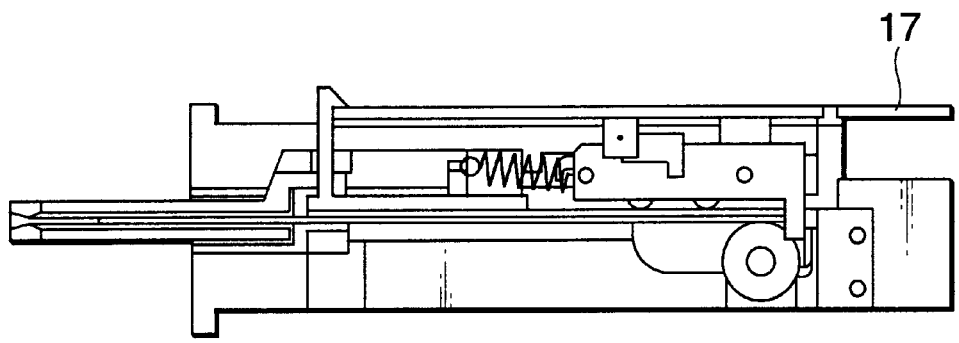

This embodiment has an arrangement similar to that of the first embodiment. A description will be given of the operation in the above-described arrangement. The card 20 is inserted through the card inserting portion 2 of the card reader while expanding the card guide 5. The card guide 5 expands in correspondence with the width of the card 20. The card guide 5 is pressed by the force of the opposing spring 9 for a card guide, which acts with the shaft 10 for a card guide as a center, so that the card guide 5 is set in the state of pressing the side surfaces of the card 20. The movement of the card guide 5 is detected by the switch for detecting the width of the card guide. The card 10 is inserted into the card guide passage for guiding the card 20 to the interior of the card reader body portion 1. When the card 20 together with the IC contact holder 3 urged by the ejection spring 7 is inserted into the interior of the card guide passage in the card reader body portion 1 up to the position where the reading and writing of information with respect to the card 20 are effected, the rotating member 12 rotates in the direction of pressing the card, as shown in FIGS. 9A and 9B. The contact-opposing lever 12c of the rotating member 12 is pressed against the card 20 and when it has become parallel with the card 20, the rear end surface of the rotating member 12 sets in an operating state the switch 8 provided in the rear portion of the card reader, so as to effect switching. When the card 20 is thus inserted up to a predetermined position, the switch 8 can be switched on, which in turn causes the power supply of the electric circuit shown in FIG. 10 to be turned on. Hence, it is possible to attain the power saving of the circuit in the same way as in the fourth embodiment.

As is apparent from the foregoing description, with the IC card reader of the present invention, a mechanism is provided wherein the rotating member is provided which is rotated by the insertion of the card when the card is inserted up to a predetermined position, so as to hold the card in cooperation with the IC contact and press the card from the side of the card opposite to its side where the IC contact is provided, as the rotating member is rotated. Accordingly, since the position of the card can be maintained, it is possible to reliably effect the reading and writing with respect to the card.

In addition, with the IC card reader of the present invention, the rotating member is provided which is rotated by the insertion of the card, and the rotating shaft of the rotating member is provided on the side of the card opposite to its side where the IC contact is provided. Accordingly, since the card presser and the contact-opposing lever of the rotating member are able to positively press the card from the side opposing the IC contact, it is possible to reliably effect the reading and writing with respect to the card.

In addition, with the IC card reader of the present invention, when the card is inserted up to a predetermined position, the rotating member is rotated, and the contact-opposing lever of the rotating member comes into contact with the card. Since a spring member and a card presser plate serving as the resilient member are provided on the contact-opposing lever, the IC contact and the card are set in such a positional relationship as to be positively brought into contact with each other, so that it is possible to reliably effect the reading and writing with respect to the card.

FIG. 10 is a diagram illustrating the switching operation of the switch with respect to the rotating member in the card reader. In the card reader of the present invention, a switch for detecting the insertion of the card in interlocking relation to the card guide upon the insertion of the card is provided, and undergoes switching operation such that when a normal card is inserted, the card detection switch is set in an operating state, and when the card is drawn out or when the card is not inserted, the card detection switch is set in a non-operating state. When the card detection switch is set in the operating state, the power supply of an electric circuit is set in an on-state and power is transferred to the IC reading/writing circuit, the magnetic reading circuit and the sensor circuit as shown in FIG. 10. When the card detection switch is in the non-operating state, the power supply of the electric circuit is turned off, thereby attaining power savings.

In addition, with the IC card reader of the present invention, the card detection switch can be switched on as a side surface of the card comes into contact with the card detection switch, and it is possible to obtain an advantage similar to that of the IC card reader according to claim 4.

In addition, with the IC card reader of the present invention, when the card is inserted and reaches a predetermined position, the rotating member rotates. A switch for detecting the movement of an end surface of the rotated rotating member is provided in the rear inside the card reader, thereby providing a switching function whereby whether or not the card has been properly guided to the predetermined position. Thus, since the position of the IC terminal on the card with respect to the IC contact, it is possible to reliably effect the reading and writing with respect to the card. Furthermore, it is possible to control the turning on of the electric circuit and the like by means of the switching function of this switch, so that power saving can be attained.

While only a certain embodiments of the invention have been specifically described herein, it will be apparent that numerous modifications may be made thereto without departing from the spirit and scope of the invention.

The present invention is based on Japanese Patent Application No. Hei. 11-60068 which is incorporated herein by reference.

What is claimed is:

1. An IC card reader comprising:

a card reader body portion having a card inserting portion for inserting a card into the card reader body portion;

an IC contact for coming into contact with an IC contact terminal on a front surface of the card;

an IC contact holder holding said IC contact; wherein said IC contact holder moves together with the card upon insertion of the card; and a rotating member which is rotated by insertion of the card, said rotating member comprising a contact-opposing lever and at least two guides located at opposite end portions of the rotating member, wherein said rotating member starts to rotate as the card presses a portion of said rotating member, and said guides press the card on a rear surface thereof when said rotating member rotates, and wherein said guides together with an opposing inner surface of the card reader body portion serve as a card presser to press a warped or bent card into a flat shape.

2. The IC card reader according to claim 1, wherein said contact-opposing lever includes a card presser plate, said card presser plate secured to a portion of said contact-opposing lever which comes into contact with the card, wherein said contact-opposing lever includes pressing means to apply a pressing force on the card presser plate in a direction toward the card to bring the IC terminal into contact with the IC contact when the card presser plate is located parallel with the card.

3. An IC card reader comprising:

a card reader body portion having a card inserting portion for inserting a card into the card reader body portion;

an IC contact for coming into contact with an IC contact terminal of the card;

an IC contact holder holding said IC contact, wherein said IC contact holder moves together with the card upon insertion of the card; and a rotating member as a lever which is rotated by insertion of the card, said rotating member comprising a rotating shaft and a card pressing plate secured to a portion of said rotating member which comes into contact with the card;

wherein said rotating shaft of said rotating member is located opposite to a side where said IC contact is provided, and wherein when said card is in a predetermined position in the card reader body portion said IC contact presses on the card with a first pressing force in a first direction, and said card pressing plate presses on the card with a second pressing force in a second direction opposing to the first direction to bring the IC terminal into contact with the IC contact, wherein said rotating member includes pressing means to push the card presser plate toward the card when the card presser plate is located parallel with the card.

4. The IC card reader according to claim 3, wherein said card pressing plate is a resilient member.

5. An IC card reader comprising:

a card reader body portion having a card inserting portion for inserting a card into the card reader body portion;

an IC contact for coming into contact with an IC contact terminal on a surface of the card;

a switch which is switched on by insertion of the card;

a power supply turning-on member which operates by switching on of said switch; and a rotating member which is rotated by insertion of the card, said rotating member comprising a contact-opposing lever, wherein said contact-opposing lever presses the card on a surface thereof when said rotating member rotates, and wherein said switch is provided for being in contact with a rear end portion of the contact opposing lever and is switched on when the contact-opposing lever is rotated to bring the IC terminal into contact with the IC contact.

6. The IC card reader according to claim 5, wherein, said switch is provided for being in contact with a side surface of the card and switched on when the side surface of the card is brought into contact therewith.

7. The IC card reader according to claim 1, wherein said rotating member is provided with a switch.

8. The IC card reader according to claim 7, wherein the switch controls a power supply.

9. The IC card reader according to claim 3, wherein the card is placed in a flat shape when the card is inserted into said IC card reader body portion.

10. The IC card reader according to claim 3, wherein said rotating member is provided with a switch and the switch controls a power supply.

11. The IC card reader according to claim 2, wherein said card presser plate is a resilient member.

12. The IC card reader according to claim 2, wherein said pressing means is proved by at least one presser plate spring.

13. The IC card reader according to claim 2, wherein said pressing means is provided by a leaf spring formed in the card presser plate.

* * * * *

UNITED STATES PATENT AND TRADEMARK OFFICE
CERTIFICATE OF CORRECTION

PATENT NO.     : 6,616,050 B1
DATED          : September 9, 2003
INVENTOR(S)    : Hajime Oki et al.

It is certified that error appears in the above-identified patent and that said Letters Patent is hereby corrected as shown below:

Title page,
Item [56], References Cited, FOREIGN PATENT DOCUMENTS,
please delete the following duplicate reference:
"JP     881589 A1     *     12/1998".

Figure 11:
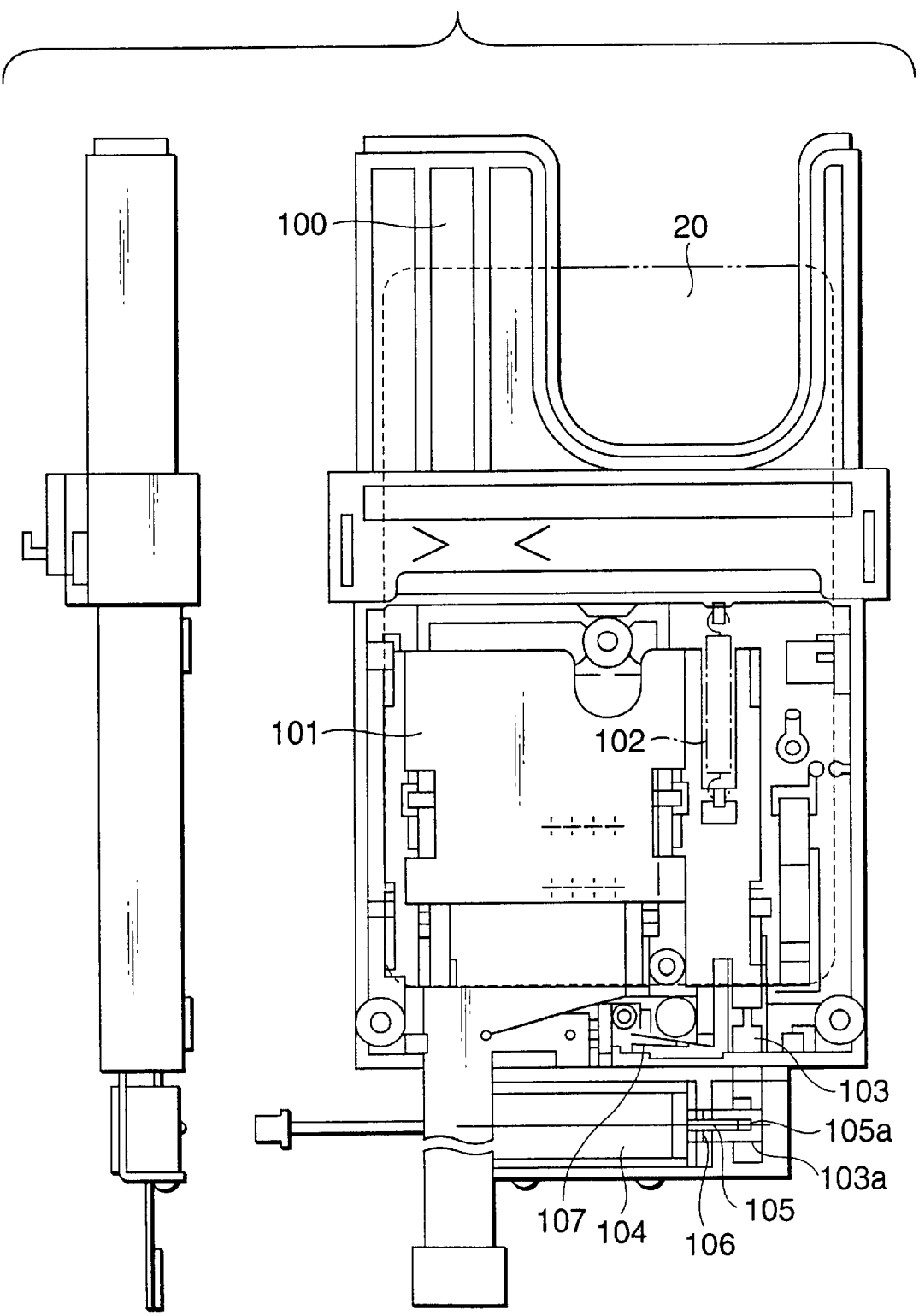
FIG. 11 is a diagram illustrating a conventional card reader.
Figure 11:
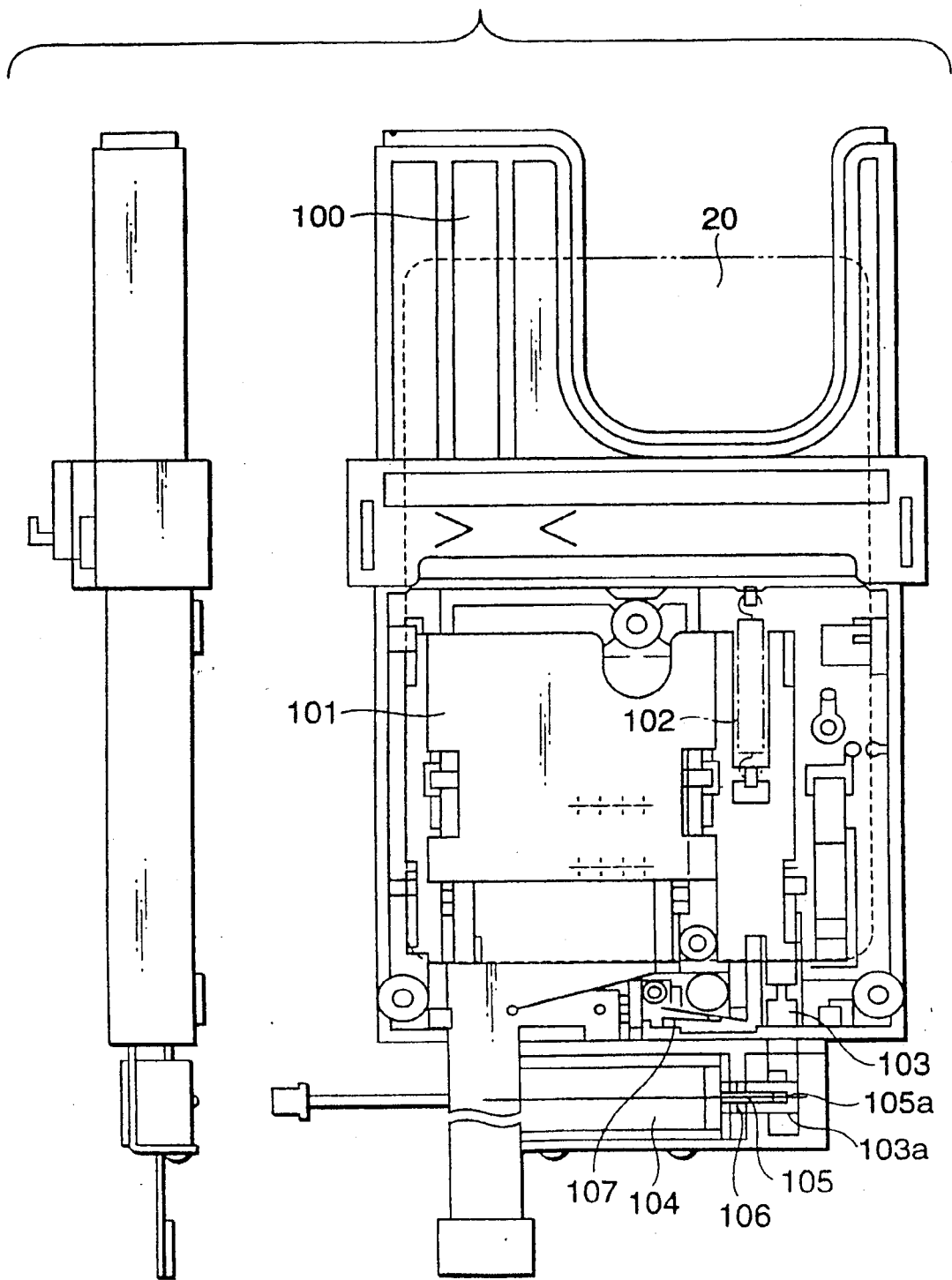

Delete Drawing Sheet 11 of 11, and substitute therefor the drawing, consisting of Fig. 11, as shown on the attached page.

Column 3,
Line 60, please delete "width wise", and insert therefor -- widthwise --.

Signed and Sealed this

Seventeenth Day of February, 2004

JON W. DUDAS
*Acting Director of the United States Patent and Trademark Office*